United States Patent
Meulenbrugge

(10) Patent No.: US 6,442,238 B2
(45) Date of Patent: Aug. 27, 2002

(54) FDXD DETECTOR WITH DOSE SENSING

(75) Inventor: Hendrik Jan Meulenbrugge, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/821,132

(22) Filed: Mar. 29, 2001

(30) Foreign Application Priority Data

Mar. 31, 2000 (EP) .............................. 00106879

(51) Int. Cl.$^7$ .............................. H05G 1/64; H05G 1/44
(52) U.S. Cl. ...................... 378/98.8; 378/108; 250/366; 250/368; 250/370.09; 250/370.11
(58) Field of Search ................................ 378/98.8, 108; 250/366, 308, 370.09, 370.11

(56) References Cited

U.S. PATENT DOCUMENTS 5,751,783 A * 5/1998 Granfors et al. ............ 378/108
5,949,848 A * 9/1999 Gilblom ..................... 378/98.8

FOREIGN PATENT DOCUMENTS

EP          0799521 A1    6/1997    ............. G01T/1/24

* cited by examiner

Primary Examiner—Robert H. Kim
Assistant Examiner—Allen C. Ho

(74) Attorney, Agent, or Firm—John Vodopia

(57) ABSTRACT

The invention relates to an X-ray system which includes an X-ray source and an X-ray detector for deriving an image signal. The X-ray detector includes an X-ray matrix sensor, such as an FDXD, which includes a matrix of sensor elements. Preferably, the sensor elements are light-sensitive α-Si sensor elements (photodiodes) and the FDXD is provided with a scintillator layer which converts X-rays into light. The sensor elements generate electric charges that are read out in the form of an image signal that represents the X-ray image.

The X-ray matrix sensor is provided with an additional array of detection elements which are arranged between the sensor elements and the X-ray source. More specifically, the detection elements are also α-Si light-sensitive photodiodes. The scintillator layer is arranged between the X-ray matrix sensor and the additional array of detector elements. A partly transparent coating is disposed between the additional array of detector elements and the scintillator layer. The number of detector elements of the additional array is far less than the number of sensor elements.

The additional array is employed to derive a dose control signal. The dose control signal represents the local X-ray dose received at the individual detector elements. The dose control signal is employed to control the X-ray source. About 5% of the light from the scintillator is used to form the dose control signal.

8 Claims, 2 Drawing Sheets

FDXD DETECTOR WITH DOSE SENSING

BACKGROUND OF THE INVENTION

The invention relates to an X-ray device which includes an X-ray source and a sensor matrix that is covered by a scintillator, and also includes means for measuring the X-ray dose incident on the sensor matrix.

For the safety of the patient as well as for the image quality it is necessary to measure and control the X-ray dose in X-ray diagnostics. Among the means for measuring the X-ray dose there are means that operate on the basis of preceding images and those that measure the X-ray dose in real time.

EP 0 779 521 A1 discloses an X-ray device with an X-ray source and a sensor matrix that is covered by a scintillator, as well as with means for real-time measurement of the X-ray dose incident on the sensor matrix. The means for measuring the X-ray dose (dosimeter) consist of a matrix of rectangular electrode elements which are arranged so as to be separated from a further electrode layer by an amorphous silicon layer. The silicon layer converts the X-rays into electric signals and behaves as an ionization chamber in which ions are formed that are charged in proportion to the intensity of the X-rays. The number of ions forms an electric signal corresponding to the X-ray intensity.

The signals delivered by the detection elements of the dosimeter, being constructed as X-ray sensors, are very small and hence difficult to evaluate. Moreover, the X-ray sensors degrade the image quality.

On the basis of the described state of the art the invention has for its object to avoid said drawbacks.

This object is achieved for an X-ray device of the kind set forth in that a matrix of light-sensitive detection elements is arranged over the imaging sensor matrix and in the path of the X-rays and that a partly transparent reflector is arranged between the scintillator and the matrix with detection elements, said reflector being connected to the scintillator and to the matrix with detection elements and the number of sensors of the sensor matrix being larger than the number of the detection elements related to the relevant matrix surface.

The construction of the sensor matrix, notably an FDXD (Flat Dynamic X-ray Detector), is that of a customary FDXD. The pixels of the sensor matrix customarily consist of a respective photodiode and a TFT transistor and are arranged in a matrix consisting of rows and columns. The scintillator converts the X-rays incident on the sensor matrix into visible light. The light is absorbed by the photodiodes of the individual pixels of the sensor matrix that are situated therebelow and is stored as an electric charge in the capacitances of the photodiodes whose charges are periodically read out via thin film transistors (TFTs). The reading out progresses from row to row. The scintillator is customarily provided with a reflector which serves to reflect the visible light that is reflected by the scintillator directly back into the matrix so as to optimize the signal strength. Now the major difference between the invention and the conventional X-ray devices with a dosimeter commences. According to the invention a partly transparent reflector is connected to the scintillator. This partly transparent reflector allows a small part of the light to emanate again from the scintillator so as to enter the matrix with light-sensitive detection elements that is arranged above the sensor matrix.

The number of sensors of the sensor matrix exceeds the number of detection elements, that is, related to the relevant matrix surface. This means that the detection elements have a surface area that is larger than that of the sensors of the sensor matrix, for example, 1×1 $cm^2$ instead of 0.15×0.15 $mm^2$. When the significantly smaller number of light-sensitive detection elements is read out with high frame rates during an X-ray pulse, the device in accordance with the invention enables real time information concerning the signal build-up in the detection elements during the X-ray pulse to be used so as to control the dose of the instantaneous X-ray pulse. Because only approximately 5% of the light from the scintillator is required for the light-sensitive detection elements, the greater signal strength in the sensor matrix results in a significantly enhanced image quality in comparison with the state of the art. The partly transparent reflector, moreover, ensures that a fixed relationship exists between the dose signal for the light-sensitive detection elements and the image signal for the sensor matrix, said relationship being defined by the degree of partial transparency of the reflector and being, in a technical sense, practically independent of the spectral composition of the X-rays. The spectral composition is determined inter alia by the anode material of the X-ray source, the material and the thickness of the exit window for the X-rays at the X-ray source, the high voltage used and the filtering and absorption of the X-rays by the patient and the table.

In order to minimize the absorption of X-rays, the substrate material of the matrix with detection elements in a preferred embodiment of the invention consists of a film of a synthetic material that has a low X-ray absorption, for example, polystyrene, polyester or polycarbonate.

When the light-sensitive detection elements are constructed as photodiodes provided with an amorphous silicon layer, no damaging of the detection elements by the X-rays is to be expected. The metallic electrodes of the photodiodes, however, could absorb a small part of the X-rays and give rise to image defects in given circumstances. In order to avoid such image defects, in an embodiment of the invention it is proposed to provide the matrix with light-sensitive detection elements with a transparent metal layer that covers those regions of the matrix surface that are not covered already by transparent metal layers formed by the electrodes of the detection elements. The different metal layers together cover the entire matrix surface so that image defects are precluded.

In order to enable effective influencing of the dose of the X-ray pulse already during the signal build-up, it is advantageous to read out the matrix of the detection elements with high image repetition rates. The image repetition rates preferably amount to from one thousand to some tens of thousands of images per second. In any case the image repetition rate should be selected to be so high that in the case of an X-ray pulse duration of only a few milliseconds an adequate number of read-out operations can be performed in the matrix with detection elements so as to enable adequately accurate adjustment of the desired dose.

SUMMARY OF THE INVENTION

The read-out speed can be increased by reading out in parallel a plurality of rows of detection elements that are also arranged in rows and columns. Finally, from the matrix of detection elements sub-regions can be selected for the measurement and control of the X-ray dose. For example, those regions that are exposed directly to the X-rays can be selected.

BRIEF DESCRIPTION OF THE DRAWINGS

The invention will be described in detail hereinafter with reference to the FIGS. 1 and 2. Therein.

DESCRIPTION OF THE PREFERRED EMBODIMENT

Figure 1:
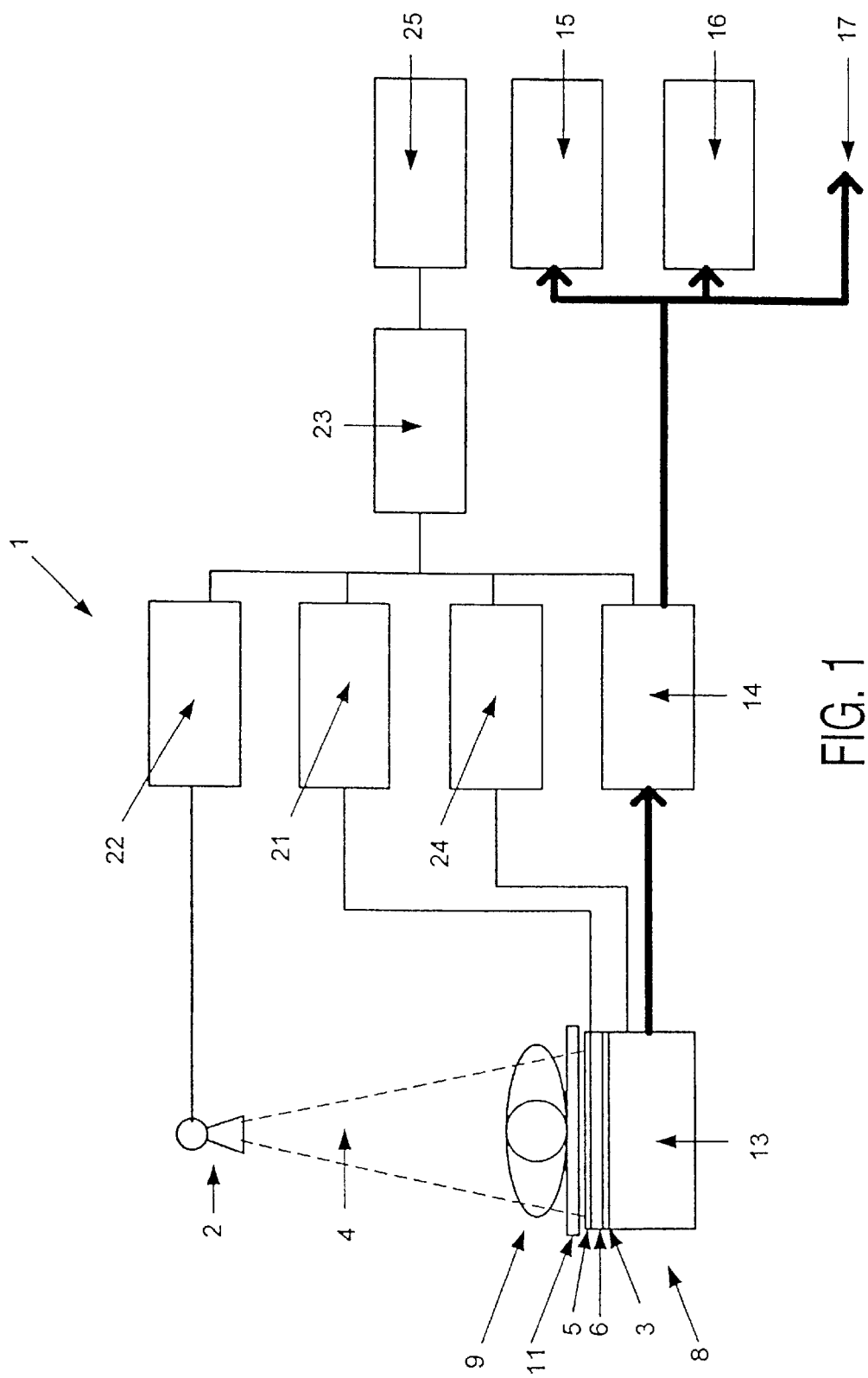
FIG. 1 shows a circuit diagram of an X-ray device in accordance with the invention.

FIG. 1 shows an X-ray device which is denoted overall by the reference numeral 1 and includes an X-ray source 2 whose X-rays are incident on a sensor matrix 3. Above the sensor matrix and in the path 4 of the X-rays there is arranged a matrix of light-sensitive detection elements 18 that is referred to hereinafter as the dosimeter 5 for the sake of brevity and is separated from the sensor matrix 3 by a scintillator 6 and a partly transparent reflector 7 that is arranged over the scintillator 6 and is shown only in FIG. 2.

In the beam path 4 between the X-ray source 2 and the flat X-ray detector, denoted overall by the reference numeral 8, there is arranged a patient 9 who is to be irradiated by the X-rays and is positioned on the X-ray transparent table 11.

Figure 2:
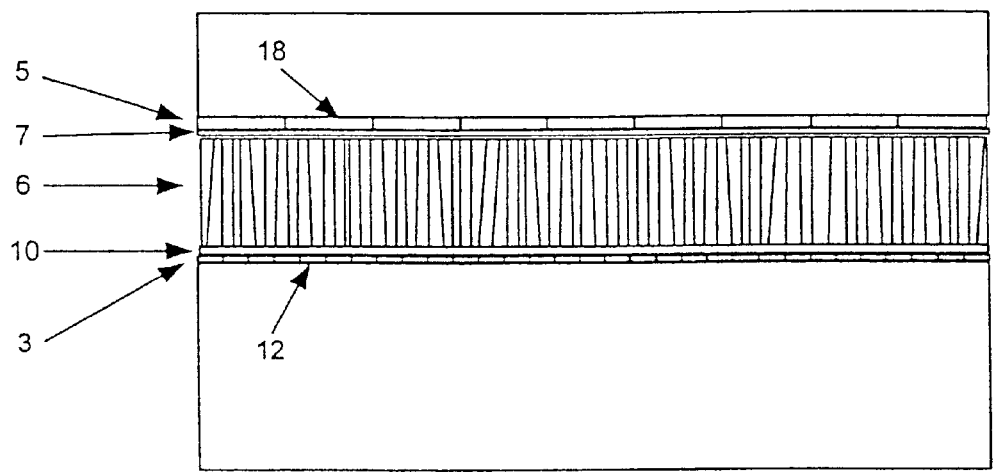
FIG. 2 is a detailed view of a sensor matrix with means for measuring the X-ray dose.

The detailed construction of the flat X-ray detector 8 can be derived from the cross-sectional view of FIG. 2. The X-rays are converted into light in the scintillator 6 which consists of crystalline needles, that consist of thallium-doped cesium iodide ($CsI(T_i)$) in the present example. The light is incident on the sensors (pixels) 12 that are arranged in rows and columns in the sensor matrix 3 and are formed by photodiodes of amorphous silicon as well as a thin film transistor (TFT).

On the scintillator 6 there is provided the partly transparent reflector 7 which reflects the major part of the light of the scintillator 6 to the sensors 12 of the sensor matrix 3. A small part of the light, that is, from approximately 5 to 10%, however, can pass the partly transparent reflector 7 in the direction of the dosimeter that is denoted overall by the reference numeral 5. The dosimeter 5, constructed essentially in conformity with the sensor matrix, consists of the detection elements 18 that are substantially larger than the pixels 12 as can be clearly seen in the cross-sectional view of FIG. 2. In order to ensure an adequate read-out speed, the number of pixels 12 should be at least a factor of 1000 larger than the number of detection elements 18. Between the sensor matrix 3 and the scintillator 6 there is provided a light transparent isolation layer 10 that protects the sensor matrix 3 against chemical effects from the scintillator 6. The detection elements 18 also include a photodiode with an amorphous silicon layer and are arranged in rows and columns like the pixels 12 of the sensor matrix 3.

The individual pixels 12 of the sensor matrix 3 are read out one row after the other by a read electronic circuit 13, the electric charges being applied to charge-sensitive preamplifiers in said electronic circuit. The output signals of the preamplifiers are digitized and further processed so as to form image data that are representative of the X-ray distribution on the sensor matrix 3.

The individual detection elements 18 are read out in rows via TFT transistors. However, TFT transistors can also be dispensed with when each of the detection elements 18 is connected to a separate preamplifier channel that is not shown either in the Figures. Such a solution presents a simplification of the detection elements 18, but necessitates a large number of separate signal amplifiers and connection conductors, because each detection element 18 requires a separate connection lead instead of the common lead provided per row of detection elements.

The output signals of the detection elements 18 are further processed by a dose signal processor 21.

The detailed operation of the X-ray device is as follows.

The desired reference values for the next image, for example, the image format, the exposure duration and notably the radiation dose, are entered via a user interface 25 to a system controller 23. As soon as an X-ray generator 22, the dose signal processor 21, a detector controller 24 and an image processor 14 as shown in FIG. 1 are ready, the system controller 23 receives an acknowledgement and generates a start signal which causes the X-ray generator 22 to emit X-rays. After the start signal, the execution in time of the signal processing is controlled exclusively by the detector controller 24. The dose signal processor 21 then processes the signals arriving from the dosimeter 5 so as to form a real-time dose signal (actual value) that is continuously compared with the preset reference value for the X-ray dose by the system controller 23. The result of the reference/actual value comparison is applied to the X-ray generator 22 which subsequently initiates the necessary changes so as to reach the desired reference value for the dose. To this end, the X-ray generator 22 may vary a parameter such as the high voltage value and the current of the X-ray source 2 as well as the duration of the X-ray pulse. When the reference value for the dose is reached, the X-ray generator 22 immediately switches off the X-ray source 2. The X-ray image is then correctly exposed. Subsequently, the X-ray image is read out from the sensor matrix 3 under the control of the detector controller 24 so as to be processed in the image processor 14. During the image processing in the image processor the defects induced by the sensor matrix 3 are compensated and the image quality is enhanced, for example in that the sharpness of the image is enhanced in known manner. Finally, the image further processed in the image processor 14 is applied to a monitor 15, an image memory 16 and/or a network 17.

List of References

| number | description |
|---|---|
| 1 | X-ray device |
| 2 | X-ray source |
| 3 | sensor matrix |
| 4 | beam path |
| 5 | dosimeter |
| 6 | scintillator |
| 7 | partly transparent reflector |
| 8 | flat X-ray detector |
| 9 | patient |
| 10 | isolation layer |
| 11 | table |
| 12 | pixel |
| 13 | electronic read-out circuitry |
| 14 | image processor |
| 15 | monitor |
| 16 | image memory |
| 17 | network |
| 18 | detection element |
| 19 | — |
| 20 | — |
| 21 | dose signal processor |
| 22 | X-ray generator |
| 23 | system controller |
| 24 | detector controller |
| 25 | user interface |

What is claimed is:

1. An X-ray device which includes an X-ray source and a sensor matrix that is covered by a scintillator, and also includes means for measuring the X-ray dose incident on the sensor matrix, characterized in that
   a matrix of light-sensitive detection elements (18) is arranged over the sensor matrix (3) and in the beam path (4) of the X-rays and that a partly transparent reflector (7) is arranged between the scintillator (6) and the matrix with detection elements (18), said reflector being connected to the scintillator (6) and to the matrix with detection elements (18) and the number of sensors of the sensor matrix (3) being larger than the number of the detection elements (18) related to the relevant matrix surface.

2. An X-ray device as claimed in claim 1, characterized in that
   the substrate material of the matrix with detection elements (18) consists of a film of a synthetic material that has a low X-ray absorption.

3. An X-ray device as claimed in claim 1, characterized in that
   the substrate material of the sensor matrix (3) is a film of a synthetic material that has a low X-ray absorption, chosen from the group of polystyrene, polyester and polycarbonate.

4. An X-ray device as claimed in claim 1, characterized in that
   the light-sensitive detection elements are photodiodes with an amorphous silicon layer.

5. An X-ray device as claimed in claim 1, characterized in that
   the sensors constituting the sensor matrix (3) are provided with a respective photodiode and a TFT transistor.

6. An X-ray device as claimed in claim 1, characterized in that
   the matrix with light-sensitive detection elements (18) is provided with a transparent metal layer that covers those regions of the matrix surface that are not already covered by transparent metal layers that are constituted by electrodes of the light-sensitive detection elements (18).

7. A method of operating the X-ray device claimed in one of the claims 1 to 6, characterized in that
   the matrix with detection elements (18) is read out with high image repetition rates while an X-ray pulse is incident on the device.

8. A method as claimed in claim 7, characterized in that
   only selected regions of the matrix with detection elements (18) are read out.

* * * * *